Aug. 7, 1951 S. HALPERN 2,563,466
VEHICLE TIRE
Filed April 13, 1949 2 Sheets-Sheet 1
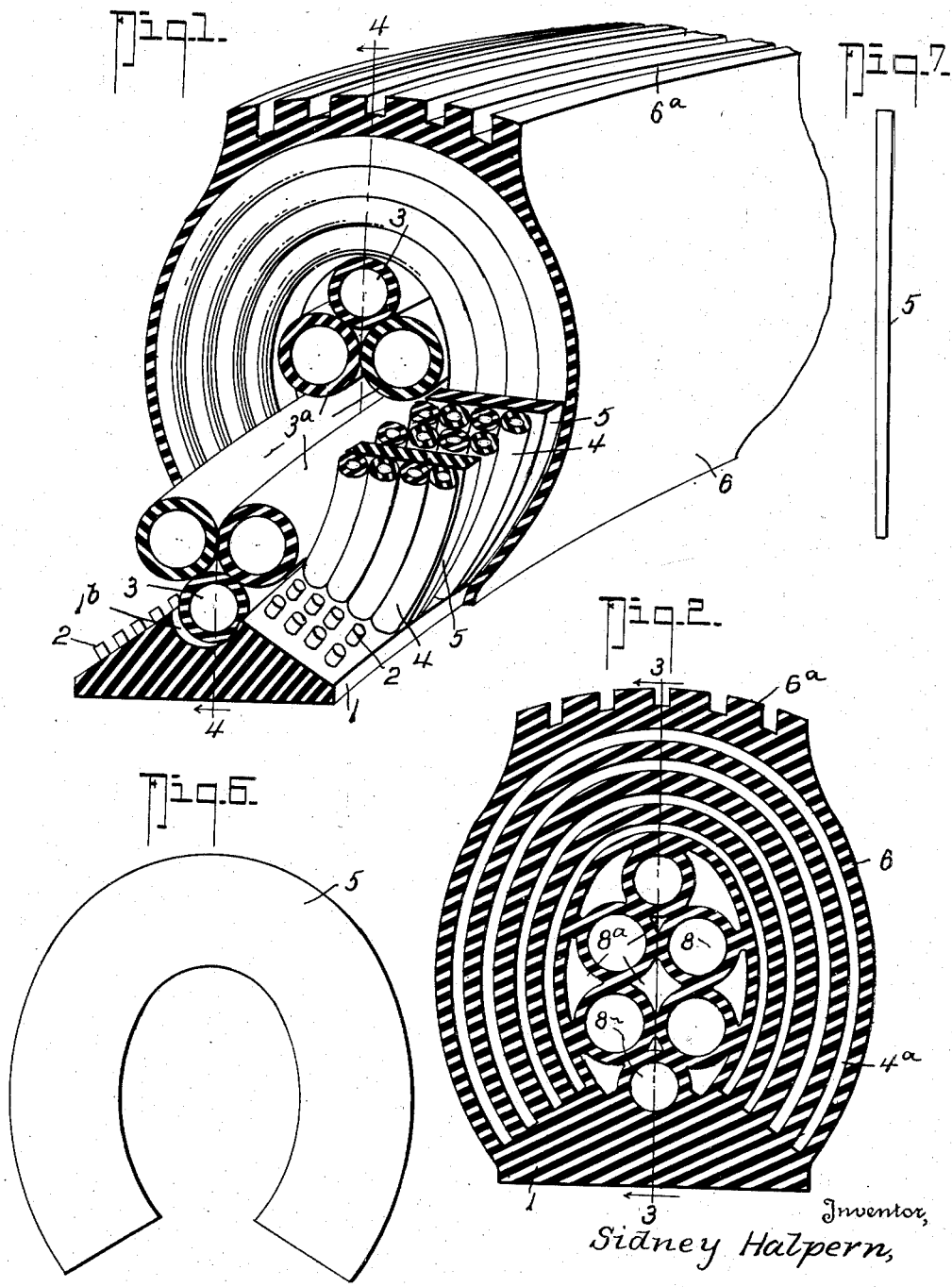
Inventor,
Sidney Halpern,
By Albert E Dieterich,
ATTORNEY.

Aug. 7, 1951  S. HALPERN  2,563,466
VEHICLE TIRE
Filed April 13, 1949  2 Sheets-Sheet 2
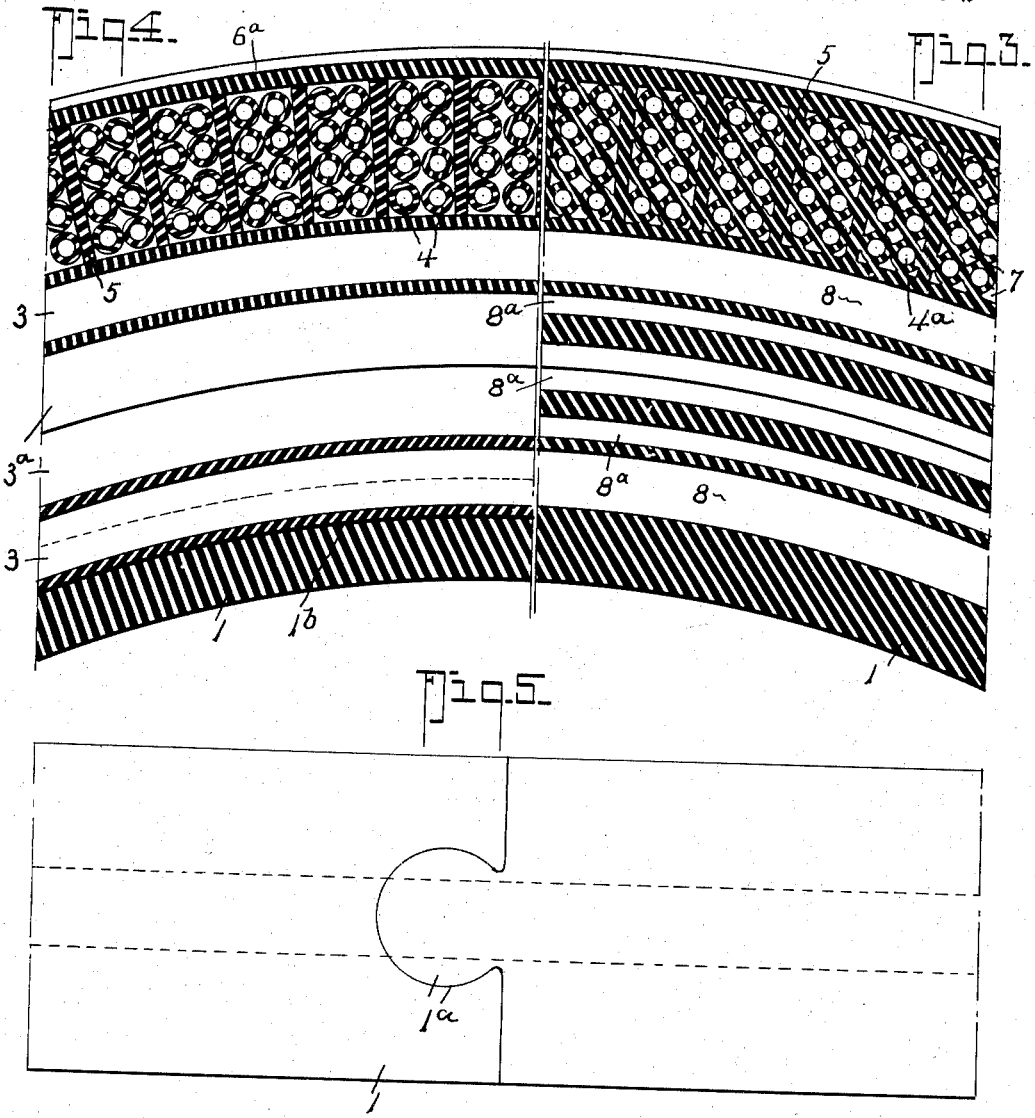
Inventor,
Sidney Halpern,
By Albert E. Dieterich,
ATTORNEY.

Patented Aug. 7, 1951

2,563,466

UNITED STATES PATENT OFFICE 2,563,466

VEHICLE TIRE

Sidney Halpern, Jacksonville, Fla.

Application April 13, 1949, Serial No. 87,293

7 Claims. (Cl. 152—328)

My invention comprises a combined cushion and air tire and it has for its objects:

1. To provide a tire which is essentially an air-bearing solid tire.
2. To provide a tire which will yield an unprecedented mileage.
3. To provide a tire that will be practically unaffected by road hazards, such as, punctures, cuts, bruises, blow outs and the like.
4. To provide a tire which requires no inflation.

To the attainment of the aforesaid objects and ends invention still further resides in the novel details of construction and arrangement of parts, all of which will be first fully described in the following detailed description, and then be particularly pointed out in the appended claims, reference being had to the accompanying drawing, in which:

Fig. 1 is a fragmentary perspective view of assembled parts of a tire embodying my invention, before vulcanization.

Fig. 2 is a cross section of the tire after vulcanization.

Fig. 3 is a detail longitudinal section on substantially the line 3—3 of Fig. 2.

Fig. 4 is a similar section on the line 4—4 of Fig. 1.

Fig. 5 is a detail inverted plan view of a portion of the base strip showing its interlocking means.

Fig. 6 is a face view of one of the wedges used in making up the tire.

Fig. 7 is an edge view of the same.

In the drawing in which like numerals and letters of reference indicate like parts in all the figures, 1 represents a base strip which has dowels 2 molded in rows crosswise of the strip. The base strip 1 is in one piece and has its ends connected together by a circular dovetail joint 1ª, as best shown in Fig. 5. The outer surface of the strip 1 has a rounded longitudinal central groove 1ᵇ to receive one of a number of core tubes 3, 3ª which run circumferentially around the base strip. The tubes 3, 3ª may be formed of rubber or rubber substitute with or without fabric or cord reinforcement as desired and may, if desired, have their ends initially united to form closed rings.

Other tubes 4 have their ends set over the dowels 2 in transverse concentric rows about the circumference of the tire. The tubes 4, like the tubes 3, 3ª may be formed of rubber or rubber substitute with or without fabric or cord reinforcement as desired.

Wedge shaped dividers 5 of generally horseshoe shape in face view are placed between certain rows of tubes 4 to fill the spaces between rows. The wedges are preferably placed between each pair of rows although they may be placed between a greater or lesser number of rows of tubes 4, as may be desired.

6 is a coat or tread sheet which is placed over the assemblage of tubes and wedges.

In assembling the several parts just described, the base strip is placed on a tire builder's wheel, gig or rack and the ends locked together by means of the dovetail joint 1ª. The core tubes 3, 3ª are then placed over the base strip as shown in Fig. 1. Next the transverse tubes 4 are fitted to the dowels 2 and embrace the core tubes 3, 3ª. After two adjacent rows of tubes 4 have been placed in position one of the wedge shaped dividers 5 is put in place so as to straddle the core tubes. The remainder of the tubes 4 and dividers 5 are assembled in the same manner.

After all tubes and dividers are in place the outer coat or tread sheet 6 is placed over the assembly and then the tire is vulcanized in a mold to bind, fix or unite the whole into an integral mass, sealing in the air within the tubes 3, 3ª and 4 and the spaces between the same as shown in Fig. 3, and at the same time form a tread 6ª of any desired design.

Thus a combined cushion and pneumatic tire is produced having endless longitudinal (circumferential) air chambers 8, 8ª and long blind-end transverse air chambers 4ª and 7 extending from the base at one side to the base at the other side and over the core.

The tubing for the core tubes and transverse tubes can be varied in caliber and temper to produce different degrees of pressure. The number also of the various tubes can be varied.

With tires of my invention only four per car are needed and the spare tire heretofore usually carried can be dispensed with.

Attention is called to the fact that the life, wear and duration of the tread surface are practically unlimited inasmuch as the tire may be worn or driven as close down to the rim as is desired and in doing so, the wear discloses, exposes and makes available a practically perpetual tread pattern as each successive layer of the transverse tubes (and eventually the core tubes) is reached and dissipated by use.

The present construction is essentially a solid tire with the interstices between the original tube elements constituting air bearing chambers, so that the pressure equivalent is derived from the stability of the solid portions and the resiliency is derived from both the solid and the air bearing portions.

Furthermore, although begun with, and as individual elements, the terminal vulcanization produces an article which is one-piece.

From the description taken in connection with the accompanying drawings it is thought the construction of the tire and its method of construction will be clear to those skilled in the art.

What I claim is:

1. A combined cushion and pneumatic tire composed of an annular base strip, a set of circumferentially disposed core tubes, and rows of transverse tubes embracing the core tubes and having their ends terminating at the base strip at the sides of the core tubes, and filler wedges located between predetermined rows of transverse tubes and a cover sheet over said tubes and the sides of the base strip, and means uniting the aforesaid parts into an integral whole.

2. A combined cushion and pneumatic tire comprising an integral structure throughout having a set of endless closed annular air chambers and rows of dead end transversely disposed air chambers encircling the annular air chambers.

3. A combined cushion and pneumatic tire comprising an integral structure throughout having a set of endless closed annular air chambers and rows of dead end transversely disposed air chambers encircling the annular air chambers and partition walls located between certain of said transversely disposed air chambers.

4. A tire composed of a base strip having its ends provided with a dovetail connecting-point, and having a circumferential groove in its top face and having dowels on its top face to each side of the groove, a plurality of core tubes one of which is held in said groove and the others are located over the one in the groove, rows of other tubes curved in elevation to horseshoe form, embracing said core tubes and having their ends engage with said dowels, horseshoe spacers interposed between pairs of rows of said other tubes with the ends of said spacers being located adjacent said base strip, and a cover over said tubes and spacers and providing a tread surface, the whole being united into an integral structure.

5. A tire composed of a base strip having its ends provided with a dovetail connecting-joint, and having a circumferential groove in its top face and a plurality of core tubes one of which is held in said groove and the others are located over the one in the groove, rows of other tubes curved in elevation to horseshoe form, embracing said core tubes and horseshoe spacers interposed between pairs of rows of said other tubes with the ends of said spacers being located adjacent said base strip, and a cover over said tubes and spacers and providing a tread surface, the whole being united into an integral structure.

6. A combined cushion and pneumatic tire comprising a body having circumferentially disposed endless air chambers embraced by a plurality of independent circumferentially spaced apart transverse dead-end air chambers embracing said circumferentially disposed endless air chambers and spaced from the same.

7. A tire composed of a base strip, a circumferentially disposed endless air tube mounted on said base, a plurality of transversely disposed air tubes the ends of which are closed by contact with said base strip, said transversely disposed air tubes being spaced apart circumferentially about the axis of the tire, and a cover sheet enclosing said tubes, all of the parts aforesaid being vulcanized into an integral whole.

SIDNEY HALPERN.

REFERENCES CITED

The following references are of record in the file of this patent:

UNITED STATES PATENTS

| Number | Name | Date |
|---|---|---|
| 580,255 | Crowther | Apr. 6, 1897 |